United States Patent
Bowler et al.

(10) Patent No.: US 10,247,275 B2
(45) Date of Patent: Apr. 2, 2019

(54) CRANKSHAFT-BALANCING ASSEMBLY AND A POWERTRAIN

(71) Applicant: GM GLOBAL TECHNOLOGY OPERATIONS LLC, Detroit, MI (US)

(72) Inventors: Alan E. Bowler, Oxford, MI (US); Michael Phylyp Kaczmar, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 15/457,369

(22) Filed: Mar. 13, 2017

(65) Prior Publication Data

US 2018/0259035 A1    Sep. 13, 2018

(51) Int. Cl.
*F16F 15/26* (2006.01)
*F02B 75/06* (2006.01)
*F16F 15/28* (2006.01)
*F01M 1/02* (2006.01)

(52) U.S. Cl.
CPC ............ *F16F 15/265* (2013.01); *F02B 75/06* (2013.01); *F01M 1/02* (2013.01); *F16F 15/264* (2013.01); *F16F 15/267* (2013.01); *F16F 15/28* (2013.01)

(58) Field of Classification Search
CPC ...... F16F 15/265; F16F 15/264; F16F 15/267; F16F 15/28; F02B 75/06; F01M 1/02
USPC ........................................... 123/192.2, 41.47
See application file for complete search history.

(56) References Cited

U.S. PATENT DOCUMENTS

| | | | |
|---|---|---|---|
| 6,286,474 B1 * | 9/2001 | Downs | F02B 67/04 123/192.2 |
| 2005/0268877 A1 * | 12/2005 | Hashimoto | F01M 1/02 123/192.2 |
| 2007/0079786 A1 * | 4/2007 | Osman | F02B 75/06 123/192.2 |
| 2011/0011364 A1 * | 1/2011 | Koyanagi | F16F 15/264 123/192.2 |
| 2014/0190442 A1 * | 7/2014 | Saito | F16H 55/18 123/192.2 |
| 2015/0083068 A1 * | 3/2015 | Sugiura | F16F 15/264 123/192.2 |

* cited by examiner

Primary Examiner — Syed O Hasan
(74) Attorney, Agent, or Firm — Quinn IP Law

(57) ABSTRACT

A powertrain includes a housing and a crankshaft-balancing assembly that is at least partially disposed inside the housing. The crankshaft-balancing assembly includes a crankshaft rotatable about a longitudinal axis. The crankshaft-balancing assembly further includes a drive member secured to the crankshaft. The crankshaft-balancing assembly also includes a first shaft rotatable about a first pivot axis. The first shaft is rotatable in response to rotation of the crankshaft. The crankshaft-balancing assembly includes a weight member that extends from the first shaft. The weight member is positioned along the first shaft to balance the crankshaft during rotation of the crankshaft and the first shaft. The crankshaft-balancing assembly also includes a drive member that surrounds the first shaft and a portion of the weight member. The drive member of the first shaft defines a void that opposes the portion of the weight member.

20 Claims, 4 Drawing Sheets

CRANKSHAFT-BALANCING ASSEMBLY AND A POWERTRAIN

INTRODUCTION

A powertrain can include a crankshaft that is rotatable about an axis in response to combustion in cylinders that move pistons. Rotation of the crankshaft can be discontinuous, i.e., not a continuously smooth revolution. As such, some powertrains utilize a balancer to minimize the discontinuous rotation of the crankshaft.

SUMMARY

The present disclosure provides a crankshaft-balancing assembly including a crankshaft rotatable about a longitudinal axis. The crankshaft-balancing assembly includes a drive member secured to the crankshaft. The crankshaft-balancing assembly also includes a first shaft rotatable about a first pivot axis. The first shaft is rotatable in response to rotation of the crankshaft. The crankshaft-balancing assembly includes a weight member that extends from the first shaft. The weight member is positioned along the first shaft to balance the crankshaft during rotation of the crankshaft and the first shaft. The crankshaft-balancing assembly also includes a drive member that surrounds the first shaft and a portion of the weight member. The drive member of the first shaft defines a void that opposes the portion of the weight member.

The present disclosure also provides a powertrain including a housing and a crankshaft-balancing assembly that is at least partially disposed inside the housing. The crankshaft-balancing assembly includes a crankshaft rotatable about a longitudinal axis. The crankshaft-balancing assembly includes a drive member secured to the crankshaft. The crankshaft-balancing assembly also includes a first shaft rotatable about a first pivot axis. The first shaft is rotatable in response to rotation of the crankshaft. The crankshaft-balancing assembly includes a weight member that extends from the first shaft. The weight member is positioned along the first shaft to balance the crankshaft during rotation of the crankshaft and the first shaft. The crankshaft-balancing assembly also includes a drive member that surrounds the first shaft and a portion of the weight member. The drive member of the first shaft defines a void that opposes the portion of the weight member.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
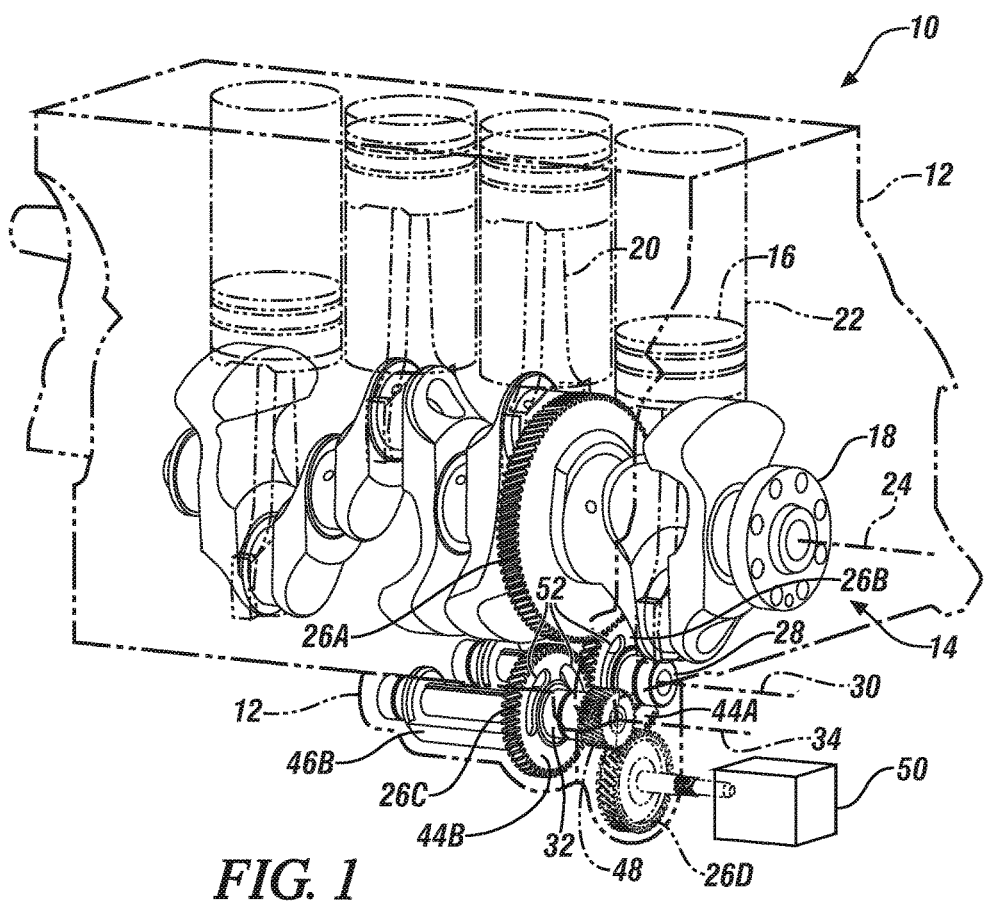
FIG. 1 is a schematic perspective view of a powertrain including a crankshaft-balancing assembly that includes a crankshaft, a first shaft and a second shaft.
Figure 6:
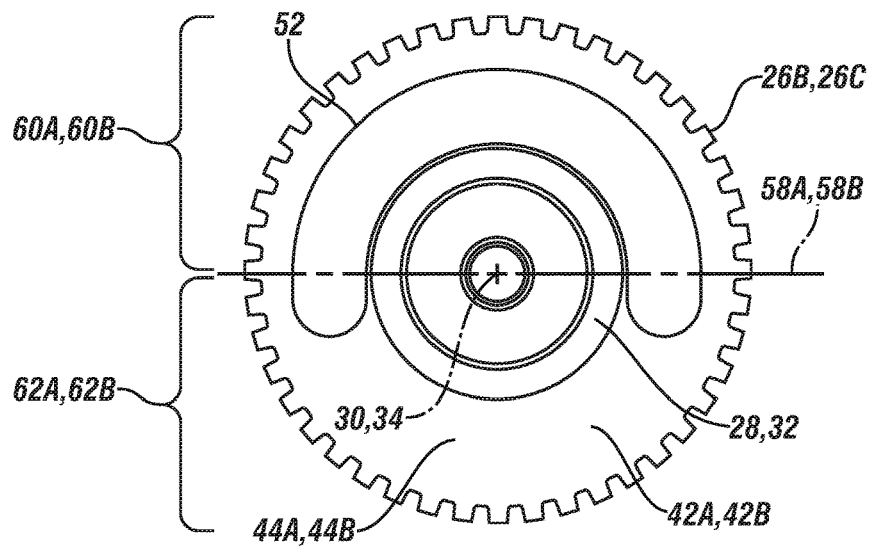
FIG. 6 is a schematic end view of either of the first and second shafts, with a drive member of another configuration illustrated.

Referring to the FIGS., wherein like numerals indicate like or corresponding parts throughout the several views, a powertrain 10 is generally shown in FIG. 1.

The powertrain 10 can be utilized in a vehicle application or a non-vehicle application. The vehicle that can utilize the powertrain 10 can be an automotive vehicle, such as, a car, a truck, etc. It is to be appreciated that the vehicle can alternatively be a non-automotive vehicle, such as, a farm vehicle, a marine vehicle, an aviation vehicle, etc. Furthermore, the powertrain 10 can be utilized with a hybrid vehicle, an autonomous vehicle or any other suitable application.

The powertrain 10 can include a housing 12. Furthermore, the powertrain 10 can include a crankshaft-balancing assembly 14 that is at least partially disposed inside the housing 12. The housing 12 can be any suitable configuration and can be formed of a plurality of pieces that cooperate with each other. Generally, the crankshaft-balancing assembly 14 is configured to reduce mass, inertia and packaging space while retaining balancing forces, which will be discussed further below.

The powertrain 10 can include various components, some of which include, but are not limited to, an engine, a transmission and a final drive coupleable to each other to rotate wheels of the vehicle to propel the vehicle. The engine can include one or more pistons 16, an output member or crankshaft 18, one or more valves, one or more rods 20, etc. The pistons 16 can be coupled to the crankshaft 18 through the rods 20.

The crankshaft 18 can be coupleable to an input member of the transmission. The transmission can include a gearing arrangement and one or more clutches through which torque is transferred from the crankshaft 18 of the engine to the input member of the transmission, then to the final drive and out to the wheels to move the vehicle. The wheels can be front wheels and/or rear wheels of the vehicle. The front and/or the rear wheels can be powered by the powertrain 10.

In certain embodiments, the housing 12 can be an engine block defining one or more cylinders 22 that each have a combustion chamber, and the pistons 16 are movable in the respective cylinders 22 in response to combustion in the respective combustion chamber. As such, when the respective pistons 16 move, the movement causes rotation of the crankshaft 18.

Figure 2:
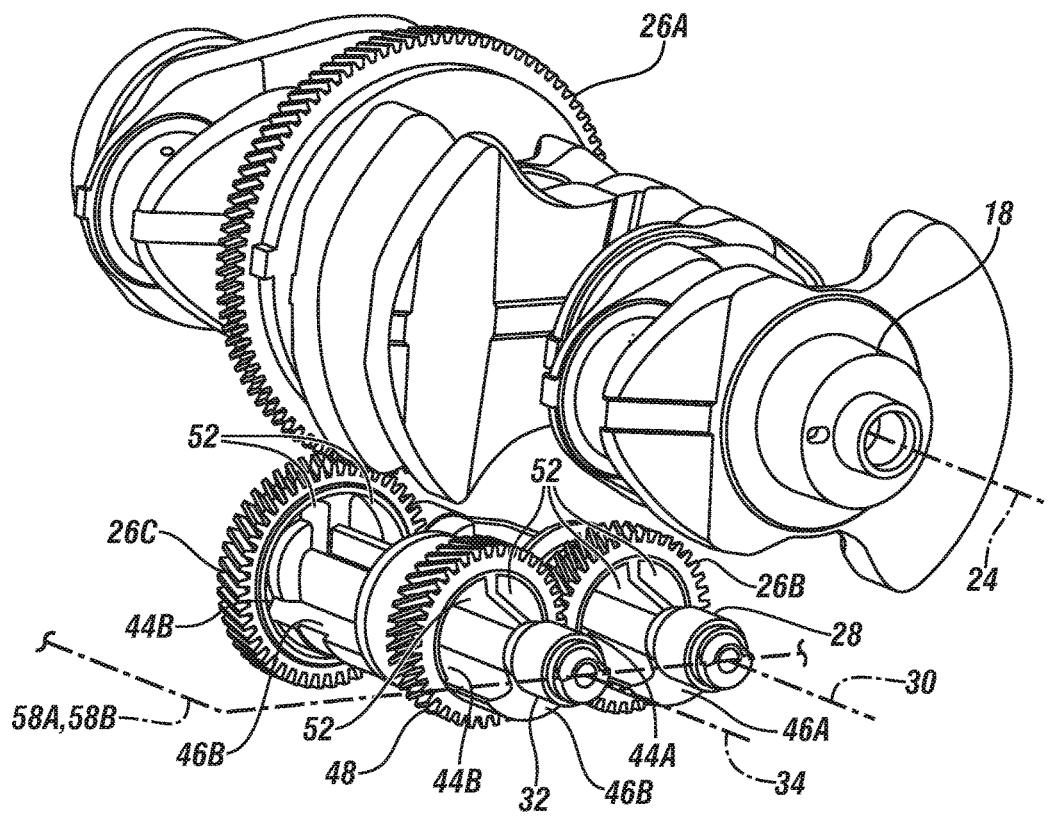
FIG. 2 is a schematic perspective view of the crankshaft, another configuration of the first shaft and another configuration of the second shaft.

Referring to FIGS. 1 and 2, the crankshaft-balancing assembly 14 includes the crankshaft 18. The crankshaft 18 is rotatable about a longitudinal axis 24. When combustion occurs in the respective combustion chamber, the respective pistons 16 move which cause the crankshaft 18 to rotate about the longitudinal axis 24. The rotation of the crankshaft 18 about the longitudinal axis 24 can be irregular due to the timing of the combustion and/or the movement of the pistons 16. In other words, rotation of the crankshaft 18 about the longitudinal axis 24 can be discontinuous, i.e., not a continuously smooth revolution, due to the timing of the combustion and/or the movement of the pistons 16. As such, the crankshaft-balancing assembly 14 described herein is configured to minimize the irregular or discontinuous rotation of the crankshaft 18.

The crankshaft 18 can be at least partially disposed inside the housing 12. In certain embodiments, the crankshaft 18 is partially disposed inside the housing 12 and partially disposed outside of the housing 12. In other embodiments, the crankshaft 18 is entirely disposed inside the housing 12. It is to be appreciated that the crankshaft 18 can be any suitable location relative to the other various components.

Continuing with FIGS. 1 and 2, the crankshaft-balancing assembly 14 includes a drive member 26A secured to the crankshaft 18. In certain embodiments, the drive member 26A of the crankshaft 18 can surround the crankshaft 18. The drive member 26A of the crankshaft 18 is secured to the crankshaft 18 such that the crankshaft 18 and the drive member 26A of the crankshaft 18 rotate in unison. The drive member 26A of the crankshaft 18 can be directly or indirectly secured to the crankshaft 18, and non-limiting examples of the method of attachment can include fasteners, welding, casting, etc. In certain embodiments, the drive member 26A of the crankshaft 18 is further defined as a gear. When the drive member 26A surrounds the crankshaft 18, the teeth of the gear (of the drive member 26A) can face outwardly away from the longitudinal axis 24.

The crankshaft-balancing assembly 14 also includes a first shaft 28 rotatable about a first pivot axis 30. The first shaft 28 is rotatable in response to rotation of the crankshaft 18. Depending on the location of the first shaft 28, rotation of the first shaft 28 can be directly or indirectly in response to the rotation of the crankshaft 18, which is discussed further below.

Figure 3:
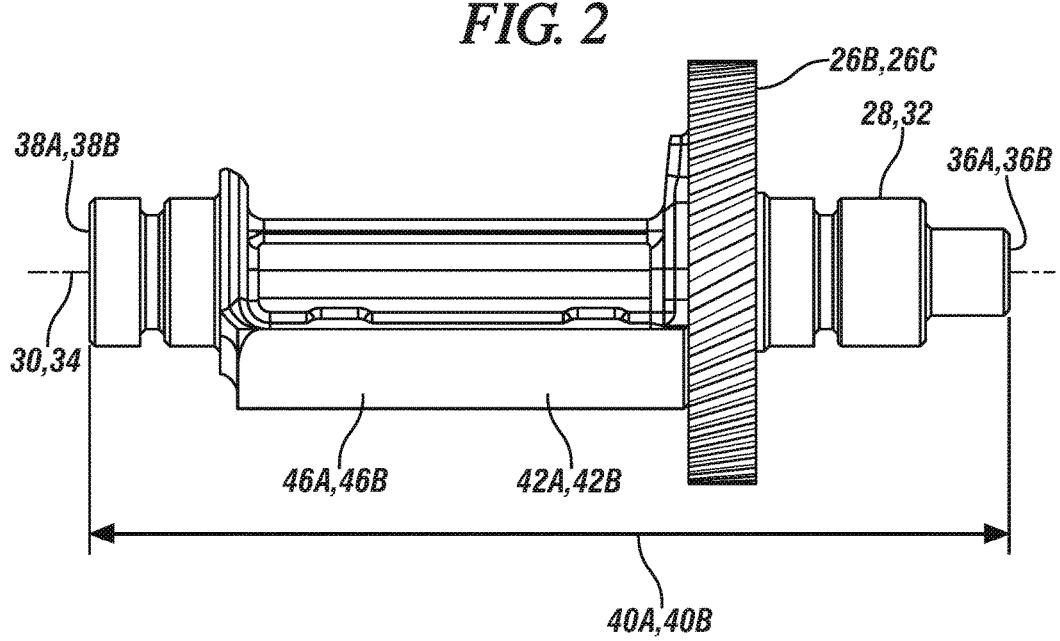
FIG. 3 is a schematic side view of either of the first and second shafts.

Referring to FIGS. 1-3, in certain embodiments, the crankshaft-balancing assembly 14 can also include a second shaft 32 rotatable about a second pivot axis 34. The second shaft 32 is rotatable in response to rotation of the crankshaft 18. Depending on the location of the second shaft 32, rotation of the second shaft 32 can be directly or indirectly in response to the rotation of the crankshaft 18, which is discussed further below.

FIG. 3 is representative of one example that either of the first and second shafts 28, 32 can be configured or both of the first and second shafts 28, 32 can be configured. Therefore, FIG. 3 is utilized to discuss common features of the first and second shafts 28, 32. As best shown in FIG. 3, the first shaft 28 can include a first end 36A and a second end 38A spaced from each other along the first pivot axis 30, and the first shaft 28 defines a length 40A between the first and second ends 36A, 38A of the first shaft 28. Similarly, the second shaft 32 can include a first end 36B and a second end 38B spaced from each other along the second pivot axis 34, and the second shaft 32 defines a length 40B between the first and second ends 36B, 38B of the second shaft 32.

The first and second shafts 28, 32 can be various configurations, and the FIGS. are illustrative of different configurations for both of the first and second shafts 28, 32. It is to be appreciated that the first and second shafts 28, 32 can be configurations other than illustrated.

Turning back to the first shaft 28 and FIGS. 1 and 2, the first shaft 28 can be at least partially disposed inside the housing 12. In certain embodiments, the first shaft 28 is entirely disposed inside the housing 12. Generally, the longitudinal axis 24 and the first pivot axis 30 can be spaced from each other and substantially parallel to each other. As such, the first shaft 28 and the crankshaft 18 can be offset from each other and substantially parallel to each other.

Referring to FIGS. 1-3, the crankshaft-balancing assembly 14 includes a weight member 42A that extends from the first shaft 28. The weight member 42A of the first shaft 28 is secured to the first shaft 28 such that the weight member 42A and the first shaft 28 rotate in unison. The weight member 42A of the first shaft 28 can be directly or indirectly secured to the first shaft 28, and non-limiting examples of the method of attachment can include fasteners, welding, casting, etc.

The weight member 42A of the first shaft 28 can be positioned along the first shaft 28 to balance the crankshaft 18 during rotation of the crankshaft 18 and the first shaft 28. Therefore, as the first shaft 28 rotates, the weight member 42A of the first shaft 28 rotates to counter the forces of the irregular rotation of the crankshaft 18, which ultimately minimizes the irregularities of the rotation of the crankshaft 18. As such, the weight member 42A of the first shaft 28 is configured to create forces that balance the rotation of the crankshaft 18. Simply stated, the weight member 42A can minimize vibration of the crankshaft 18 during rotation of the crankshaft 18. The weight member 42A of the first shaft 28 can be any suitable configuration and the FIGS. are for illustrative purposes only.

Continuing with FIGS. 1-3, the crankshaft-balancing assembly 14 also includes a drive member 26B that surrounds the first shaft 28. In certain embodiments, the drive member 26B of the first shaft 28 surrounds the first shaft 28 and a portion 44A of the weight member 42A of the first shaft 28. Therefore, as best shown in FIG. 3, another portion 46A of the weight member 42A of the first shaft 28 is spaced axially away from the drive member 26B relative to the length 40A of the first shaft 28. Simply stated, part of the weight member 42A of the first shaft 28 does not overlap the drive member 26B relative to the length 40A of the first shaft 28.

The drive member 26B of the first shaft 28 is secured to the first shaft 28 such that the first shaft 28 and the drive member 26B of the first shaft 28 rotate in unison. The drive member 26B of the first shaft 28 can be directly or indirectly secured to the first shaft 28, and non-limiting examples of the method of attachment can include fasteners, welding, casting, etc. In certain embodiments, the drive member 26B of the first shaft 28 is further defined as a gear. The teeth of the gear (of the drive member 26B) of the first shaft 28 can face outwardly away from the first pivot axis 30.

Turning to the second shaft 32 and FIGS. 1 and 2, the second shaft 32 can be at least partially disposed inside the housing 12. In certain embodiments, the second shaft 32 is entirely disposed inside the housing 12. Generally, the longitudinal axis 24 and the second pivot axis 34 can be spaced from each other and substantially parallel to each other. As such, the second shaft 32 and the crankshaft 18 can be offset from each other and substantially parallel to each other. Furthermore, in certain embodiments, the longitudinal axis 24, the first pivot axis 30 and the second pivot axis 34 can be spaced from each other and substantially parallel to each other. Therefore, the crankshaft 18, the first shaft 28 and the second shaft 32 can be offset from each other and substantially parallel to each other.

Furthermore, the crankshaft-balancing assembly 14 can include a weight member 42B that extends from the second shaft 32. As such, the weight member 42B of the second shaft 32 is secured to the second shaft 32 such that the weight member 42B and the second shaft 32 rotate in unison. The weight member 42B of the second shaft 32 can be directly or indirectly secured to the second shaft 32, and non-limiting examples of the method of attachment can include fasteners, welding, casting, etc.

The weight member 42B of the second shaft 32 can be positioned along the second shaft 32 to balance the crankshaft 18 during rotation of the crankshaft 18 and the second shaft 32. Therefore, as the second shaft 32 rotates, the weight member 42B of the second shaft 32 rotates to counter the forces of the irregular rotation of the crankshaft 18, which ultimately minimizes the irregularities of the rotation of the crankshaft 18. As such, the weight member 42B of the second shaft 32 is configured to create forces that balance the rotation of the crankshaft 18. Simply stated, the weight member 42B can minimize vibration of the crankshaft 18 during rotation of the crankshaft 18. Furthermore, if utilizing both the first and second shafts 28, 32, the weight member 42A, 42B of the first and second shafts 28, 32 can cooperate to balance the crankshaft 18 during rotation of the crankshaft 18. As such, the weight members 42A, 42B can minimize vibration of the crankshaft 18 during rotation of the crankshaft 18. The weight member 42B of the second shaft 32 can be any suitable configuration and the FIGS. are for illustrative purposes only.

Again, continuing with FIGS. 1-3, the crankshaft-balancing assembly 14 can include a drive member 26C that surrounds the second shaft 32. In certain embodiments, the drive member 26C of the second shaft 32 surrounds the second shaft 32 and a portion 44B of the weight member 42B of the second shaft 32. Therefore, as best shown in FIG. 3, another portion 46B of the weight member 42B of the second shaft 32 is spaced axially away from the drive member 26C relative to the length 40B of the second shaft 32. Simply stated, part of the weight member 42B of the second shaft 32 does not overlap the drive member 26C relative to the length 40B of the second shaft 32.

The drive member 26C of the second shaft 32 is secured to the second shaft 32 such that the second shaft 32 and the drive member 26C of the second shaft 32 rotate in unison. The drive member 26C of the second shaft 32 can be directly or indirectly secured to the second shaft 32, and non-limiting examples of the method of attachment can include fasteners, welding, casting, etc. In certain embodiments, the drive member 26C of the second shaft 32 is further defined as a gear. The teeth of the gear (of the drive member 26C) of the second shaft 32 can face outwardly away from the second pivot axis 34.

The location of the first and second shafts 28, 32 relative to the crankshaft 18 can be changed, and below are non-limiting examples. As mentioned above, depending on the location of the first and second shafts 28, 32, the shafts 28, 32 can be directly or indirectly rotatable in response to the rotation of the crankshaft 18. Simply stated, the location of the first and second shafts 28, 32 can be interchanged relative to the crankshaft 18.

Referring to FIG. 1, in certain embodiments, the drive member 26A of the crankshaft 18 and the drive member 26B of the first shaft 28 can mesh together such that the rotation of the first shaft 28 is driven by the rotation of the crankshaft 18. As such, rotation of the first shaft 28 can be directly driven by rotation of the crankshaft 18. Furthermore, in this embodiment, the second shaft 32 is spaced from the crankshaft 18, and rotation of the second shaft 32 can be directly driven by rotation of the first shaft 28. As such, the drive member 26B of the first shaft 28 and the drive member 26C of the second shaft 32 can mesh together such that the rotation of the second shaft 32 is driven by the rotation of the first shaft 28. Therefore, in this embodiment, the second shaft 32 can be rotatable about the second pivot axis 34 in response to rotation of the first shaft 28 such that the rotation of the second shaft 32 is driven by the rotation of the first shaft 28. Additionally, in this embodiment, the first shaft 28 can rotate in an opposite direction about the first pivot axis 30 from the rotation of the crankshaft 18 about the longitudinal axis 24. As such, in this embodiment, the second shaft 32 can rotate in a same direction about the second pivot axis 34 as the rotation of the crankshaft 18 about the longitudinal axis 24. Therefore, the first and second shafts 28, 32, in this embodiment, rotate in an opposite direction. As mentioned above, the first and second shafts 28, 32 can be interchanged, and therefore, in other embodiments, the second shaft 32 can be located where the first shaft 28 is shown in FIG. 1, and the first shaft 28 can be located where the second shaft 32 is shown in FIG. 1.

Alternatively, as shown in FIG. 2, the drive member 26B of the first shaft 28 can be spaced from the drive member 26A of the crankshaft 18 such that the first shaft 28 is not directly driven by the crankshaft 18. In other words, the first shaft 28 is indirectly driven by the crankshaft 18 through the second shaft 32. In this embodiment, the drive member 26A of the crankshaft 18 and the drive member 26C of the second shaft 32 can mesh together such that the rotation of the second shaft 32 is driven by the rotation of the crankshaft 18. Furthermore, in this embodiment, the drive member 26B of the first shaft 28 and the drive member 26C of the second shaft 32 can mesh together such that the rotation of the first shaft 28 is driven by the rotation of the second shaft 32. As such, rotation of the second shaft 32 can be directly driven by rotation of the crankshaft 18, and rotation of the first shaft 28 can be directly driven by rotation of the second shaft 32. In this embodiment, the second shaft 32 can be rotatable about the second pivot axis 34 in response to rotation of the crankshaft 18. As such, rotation of the second shaft 32 can be driven by the rotation of the crankshaft 18. In this embodiment, the second shaft 32 can rotate in an opposite direction about the second pivot axis 34 from the rotation of the crankshaft 18 about the longitudinal axis 24. Furthermore, in this embodiment, the first shaft 28 can rotate in a same direction about the first pivot axis 30 as the rotation of the crankshaft 18 about the longitudinal axis 24. Therefore, the first and second shafts 28, 32, in this embodiment, rotate in an opposite direction. As mentioned above, the first and second shafts 28, 32 can be interchanged, and therefore, in other embodiments, the second shaft 32 can be located where the first shaft 28 is shown in FIG. 2, and the first shaft 28 can be located where the second shaft 32 is shown in FIG. 2.

Referring to FIGS. 1 and 2, for example, the crankshaft-balancing assembly 14 can optionally include a secondary drive member 48 that extends from one or both of the first and second shafts 28, 32. Said differently, a secondary drive member 48 can be secured to the first shaft 28 and/or a secondary drive member 48 can be secured to the second shaft 32. In certain embodiments, the secondary drive member 48 can surround the respective shafts 28, 32. FIG. 1 illustrates one secondary drive member 48 in phantom lines, but it is to be appreciated this secondary drive member 48 is optional, and thus, can be eliminated. The secondary drive member 48 can be directly or indirectly secured to one of the first and second shafts 28, 32, and non-limiting examples of the method of attachment can include fasteners, welding, casting, etc. In certain embodiments, the secondary drive member 48 is further defined as a gear. The teeth of the gear (of the secondary drive member 48) can face outwardly away from the respective first and second pivot axes 30, 34.

The secondary drive member 48 in FIG. 1 can mesh with an auxiliary apparatus 50. The auxiliary apparatus 50 can be any suitable configuration, and non-limiting examples can include a pump, such as an oil pump, a motor, etc. The auxiliary apparatus 50 can include a drive member 26D (shown in phantom lines in FIG. 1) that meshes with the secondary drive member 48 (also shown in phantom lines in FIG. 1). In certain embodiments, the drive member 26D of the auxiliary apparatus 50 is further defined as a gear. The teeth of the gear (of the drive member 26D) can face outwardly toward the teeth of the gear of the secondary drive member 48 such that the teeth can mesh.

Referring to FIG. 2, the secondary drive member 48 is in a different arrangement. In this FIG., the secondary drive member 48 meshes with either the drive member 26B of the first shaft 28 or the drive member 26C of the second shaft 32. Therefore, for example, the drive member 26B and the secondary drive member 48 can be secured to the first shaft 28, or the drive member 26C and the secondary drive member 48 can be secured to the second shaft 32. As another example, with regard to FIG. 2, another secondary drive member 48 can be secured to one of the first and second shafts 28, 32 to mesh with the auxiliary apparatus 50. Therefore, more than one secondary drive member 48 can be secured to one or both of the first and second shafts 28, 32. As such, any suitable number of secondary drive members 48 can be utilized.

Turning to FIGS. 1, 2 and 4-8, the drive member 26B, 26C of the first and second shafts 28, 32, as well as the secondary drive member 48, can be various configurations, some of which are illustrated. The drive member 26B, 26C of the first and/or second shafts 28, 32, as well as the secondary drive member 48, can be any of the configurations illustrated in the FIGS. It is to be appreciated that the drive member 26B, 26C of the first and second shafts 28, 32, as well as the secondary drive member 48, can be configurations other than illustrated. Below is a discussion of some of the examples of the drive member 26B, 26C of the first and second shafts 28, 32, which are also illustrative of some examples of the secondary drive member 48.

Continuing with FIGS. 1, 2 and 4-8, the drive member 26B of the first shaft 28 defines a void 52 that opposes the portion 44A of the weight member 42A of the first shaft 28. Furthermore, the drive member 26C of the second shaft 32 can define a void 52 that opposes the portion 44B of the weight member 42B of the second shaft 32. Additionally, the secondary drive member 48 can define a void 52 (see FIG. 2); and the below discussion of the different configuration of the void(s) 52 applies to the secondary drive member 48.

Simply stated, one or more of the drive members 26A, 26B and the secondary drive member 48 can define one or more void(s) 52. Some material of the drive member 26B, 26C and/or the secondary drive member 48 is removed which reduces the mass of the drive member 26B, 26C and/or the secondary drive member 48. By reducing the mass of the drive member 26B, 26C and/or the secondary drive member 48, inertia is decreased when the respective shafts 28, 32 are rotating. Additionally, by reducing inertia, the sound produced by the meshing drive members 26A, 26B, 26C, 48 during rotation can be reduced.

Generally, the void 52 is spaced from the respective first and second pivot axes 30, 34. As such, the void 52 is non-coincident relative to the respective first and second pivot axes 30, 34. In certain embodiments, the void 52 is radially spaced from the respective first and second pivot axes 30, 34.

Figure 4:
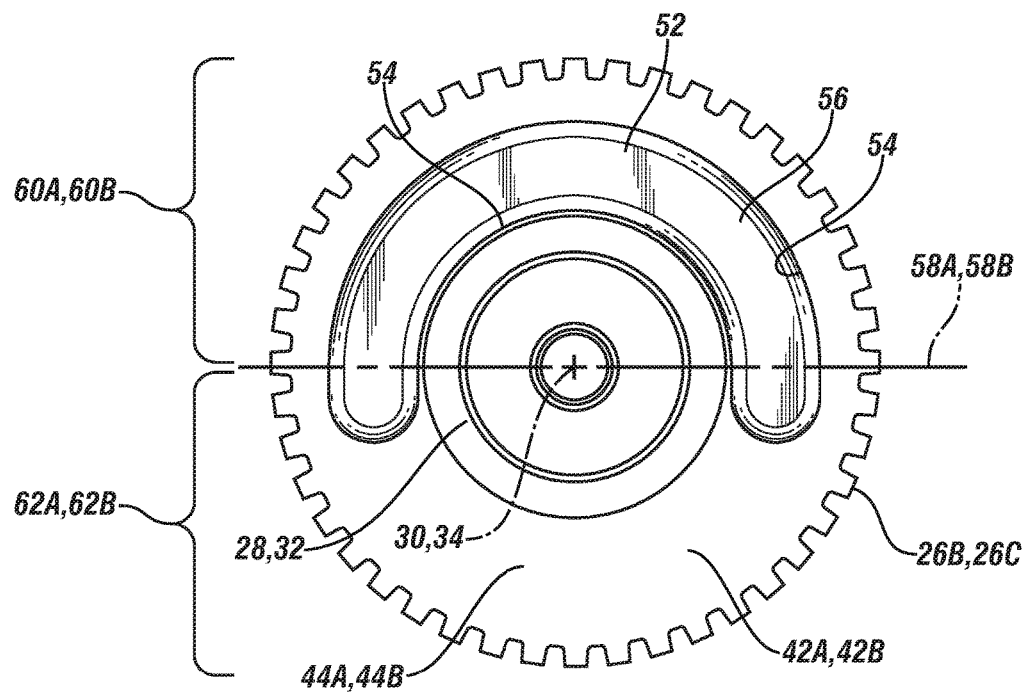
FIG. 4 is a schematic end view of either of the first and second shafts, with one side of a drive member of one configuration illustrated.
Figure 5:
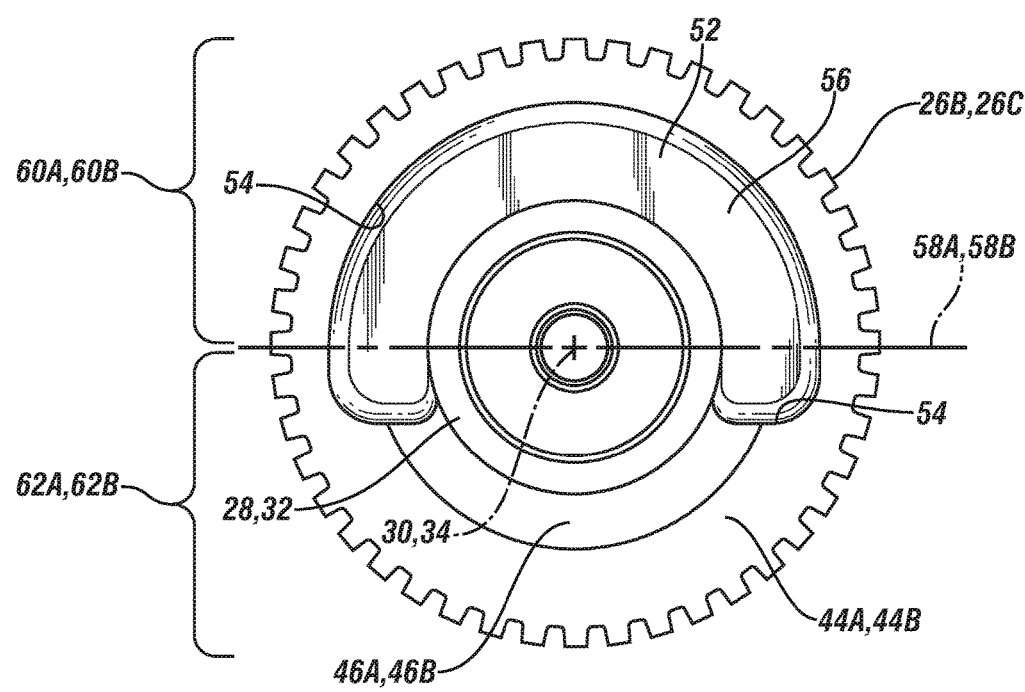
FIG. 5 is a schematic end view of the shaft of FIG. 4 from another side of the drive member of FIG. 4.

Referring to FIGS. 4 and 5, in certain embodiments, the void 52 can be disposed partially through the drive member 26B of the first shaft 28 such that the drive member 26B presents a side wall 54 and a base wall 56 that border the void 52. Similarly for the second shaft 32 (again see FIGS. 4-5), the void 52 can be disposed partially through the drive member 26C of the second shaft 32 such that the drive member 26C presents a side wall 54 and a base wall 56 that border the void 52. Therefore, in certain embodiments, the void 52 is a recess that does not form a through hole. In other words, the void 52 is a blind hole.

Referring to FIGS. 1, 2 and 6-8, in other embodiments, the void 52 can be disposed completely through the drive member 26B of the first shaft 28. Similarly for the second shaft 32 (again see FIGS. 1, 2 and 6-8), the void 52 can be disposed completely through the drive member 26C of the second shaft 32. Therefore, in certain embodiments, the void 52 is a through hole.

Figure 7:
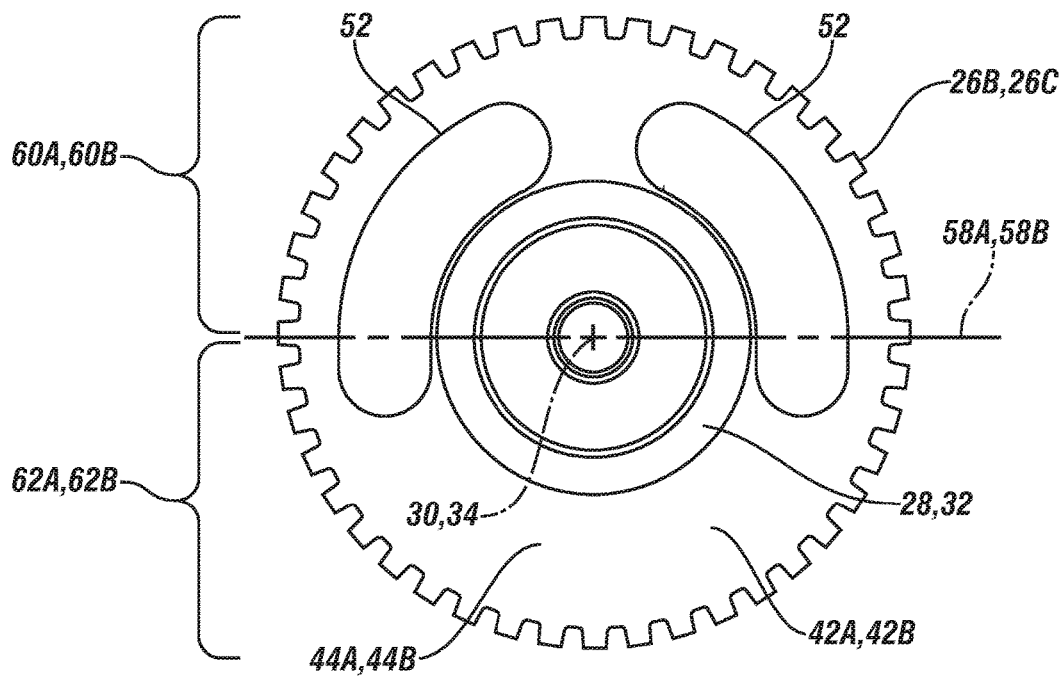
FIG. 7 is a schematic end view of either of the first and second shafts, with a drive member of yet another configuration illustrated.
Figure 8:
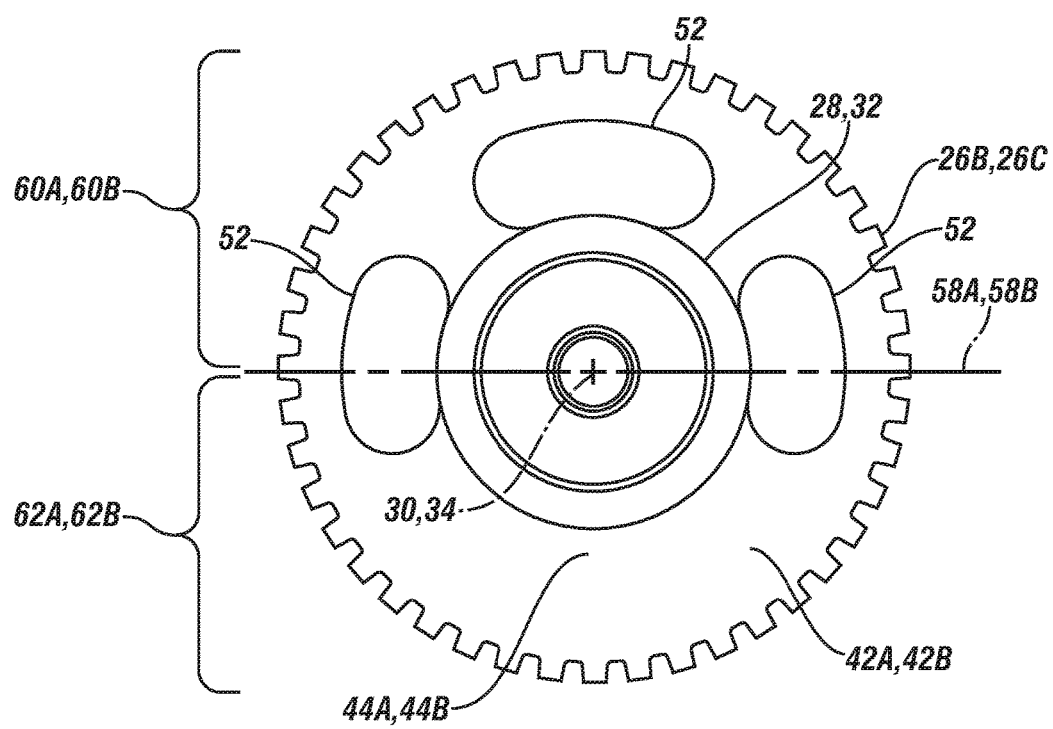
FIG. 8 is a schematic end view of either of the first and second shafts, with a drive member of another configuration illustrated.

Any suitable number of voids 52 can be utilized for the drive member 26B, 26C of the first and/or second shafts 28, 32. Each of the void(s) 52 can oppose the portion 44A, 44B of the weight member 42A, 42B. Therefore, in certain embodiments, one void 52 is utilized for the first and/or second shafts 28, 32 (see FIG. 6). In other embodiments, the void 52 can be further defined as a plurality of voids 52 spaced from each other (see FIGS. 1, 2, 7 and 8). Furthermore, in certain embodiments, the void 52 is further defined as a pair of voids 52 (as best shown in FIG. 7) spaced from each other, and the voids 52 are a mirror image of each other. In this embodiment, the pair of voids 52 can oppose the portion 44A, 44B of the weight member 42A, 42B. The void(s) 52 can be any suitable configuration and non-limiting examples can include circular, oval, square, triangular, oblong, elongated, etc.; and all of the void(s) 52 can be the same configuration, or one or more of the void(s) 52 can be different configurations from each other. Furthermore, the void(s) 52 can be formed by any suitable methods, and non-limiting examples can include casting, machining, etc.

The discussion above for the void 52 applies to the voids 52. Therefore, the voids 52 can be disposed completely through the drive member 26B of the first shaft 28, and the voids 52 can be disposed completely through the drive member 26C of the second shaft 32. Furthermore, the voids 52 can be disposed partially through the drive member 26B of the first shaft 28, and the voids 52 can be disposed partially through the drive member 26C of the second shaft 32.

For example, FIG. 4 illustrates one void 52 partially through one side of the drive member 26B, 26C, and FIG. 5 illustrates one void 52 partially through another side of the drive member 26B, 26C. In certain embodiments, the drive member 26B, 26C can define one void 52 partially through one side of the drive member 26B, 26C. In other embodiments, both sides of the drive member 26B, 26C can define one void 52. Furthermore, in yet other embodiments, a plurality of voids 52 can be defined partially through one side or both sides of the drive member 26B, 26C.

As mentioned above, FIGS. 4-8 are representative of the first and second shafts 28, 32, and representative of the drive member 26B, 26C of the first and second shafts 28, 32. As such, FIGS. 4-8 apply to both the first and second shafts 28, 32. As mentioned above, the void(s) 52 oppose the portion 44A, 44B of the weight member 42A, 42B of the respective first and second shafts 28, 32. The below discussion details various examples of the orientation of the void(s) 52 in relation to the portion 44A, 44B of the weight member 42A, 42B that is surrounded by the drive member 26B, 26C of the respective first and second shafts 28, 32. By the void(s) 52 opposing the portion 44A, 44B of the weight member 42A, 42B that is surrounded by the drive member 26B, 26C, the mass of the drive member 26B, 26C can be reduced without changing the balancing forces. Furthermore, this configuration allows the length 40A, 40B of the first and/or second shafts 28, 32 to be reduced, as compared to a design which does not utilize the voids 52, which thus reduces the packaging space.

Referring to FIGS. 4-8, the first shaft 28 can be disposed along a plane 58A, and thus, similarly, the second shaft 32 can be disposed along a plane 58B. In certain embodiments, the plane 58A of the first shaft 28 can be coincident with the first pivot axis 30, and the plane 58B of the second shaft 32 can be coincident with the second pivot axis 34. Furthermore, in certain embodiments, the plane 58A, 58B of the first and second shafts 28, 32 is coincident with each other.

Therefore, in certain embodiments, the plane 58A can be coincident with the first pivot axis 30 axially relative to the length 40A of the first shaft 28 to split the first shaft 28 in half to define a first region 60A and a second region 62A. Furthermore, in certain embodiments, the plane 58B of the second shaft 32 can be coincident with the first pivot axis 30 axially relative to the length 40B of the second shaft 32 to split the second shaft 32 in half to define a first region 60B and a second region 62B. In various embodiments, the second shaft 32 can be disposed along the plane 58A of the first shaft 28, and the plane 58A of the first shaft 28 can be coincident with the second pivot axis 34 to split the second shaft 32 in half to define the first region 60B and the second region 62B.

As best shown in FIGS. 4-8, generally, a majority of the void 52 of the first shaft 28 can be disposed in the first region 60A of the first shaft 28 and a majority of the portion 44A of the weight member 42A of the first shaft 28 can be disposed in the second region 62A of the first shaft 28. Furthermore, a majority of the void 52 of the second shaft 32 can be disposed in the first region 60B of the second shaft 32 and a majority of the portion 44B of the weight member 42B of the second shaft 32 can be disposed in the second region 62B of the second shaft 32.

The majority of the void 52 can be further defined as the plurality of voids 52. Therefore, the majority of the void(s) 52 can be seventy-five percent or more in the first region 60A, 60B. Therefore, for example, seventy-five percent or more of the void(s) 52 is disposed in the first region 60A, 60B, and thus, twenty-five percent or less of the void(s) 52 is disposed in the second region 62A, 62B. As another example, one-hundred percent of the void(s) 52 is disposed in the first region 60A, 60B, and in this embodiment, no portion 44A, 44B of the void(s) 52 is disposed in the second region 62A, 62B. Therefore, in certain embodiment, the majority of the void(s) 52 is further defined as the entire void(s) 52 is disposed in the first region 60A, 60B.

The majority of the portion 44A, 44B of the weight member 42A, 42B can be ninety percent or more in the second region 62A, 62B. In certain embodiments, the majority of the portion 44A, 44B of the weight member 42A, 42B can be one-hundred percent in the second region 62A, 62B, and in this embodiment, no portion 44A, 44B of the weight member 42A, 42B is disposed in the first region 60A, 60B. As shown in FIGS. 4-8, no portion 44A, 44B of the weight member 42A, 42B is disposed in the first region 60A, 60B. Therefore, in certain embodiments, the majority of the portion 44A, 44B of the weight member 42A, 42B is further defined as the entire portion 44A, 44B of the weight member 42A, 42B is disposed in the second region 62A, 62B.

Continuing with FIGS. 4-8, furthermore, the plane 58A splits the drive member 26B of the first shaft 28 in half; as such, a segment of the drive member 26B of the first shaft 28 can be disposed in the first region 60A of the first shaft 28 and a remaining segment of the drive member 26B of the first shaft 28 can be disposed in second region 62A of the first shaft 28. Similarly, the plane 58B splits the drive member 26C of the second shaft 32 in half; as such, a segment of the drive member 26C of the second shaft 32 can be disposed in the first region 60B of the second shaft 32 and a remaining segment of the drive member 26C of the second shaft 32 can be disposed in the second region 62B of the second shaft 32.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A crankshaft-balancing assembly comprising:
   a crankshaft rotatable about a longitudinal axis, wherein the crankshaft includes a first end and a second end spaced from each other along the longitudinal axis, wherein the crankshaft includes a middle portion disposed between the first and second ends of the crankshaft;
   a drive member secured to the crankshaft between the first and second ends of the crankshaft;
   a first shaft rotatable about a first pivot axis, wherein the first shaft is rotatable in response to rotation of the crankshaft, wherein the first shaft includes a first end and a second end spaced from each other along the first pivot axis;
   a weight member that extends from the first shaft and is disposed between the first and second ends of the first shaft, and the weight member is positioned along the first shaft to balance the crankshaft during rotation of the crankshaft and the first shaft;
   a drive member disposed between the first and second ends of the first shaft, and the drive member surrounds the first shaft and surrounds a first portion of the weight member;

wherein a second portion of the weight member extends along the first shaft between the drive member of the first shaft and the second end of the first shaft;
wherein the first and second portions of the weight member and the middle portion of the crankshaft overlap each other in a spaced apart relationship; and
wherein the drive member of the first shaft defines a void that opposes the first portion of the weight member.

2. The assembly as set forth in claim 1 wherein:
the first shaft defines a length between the first and second ends of the first shaft;
the first shaft is disposed along a plane and the plane is coincident with the first pivot axis axially relative to the length of the first shaft to split the first shaft and the drive member of the first shaft in half to define a first region and a second region; and
a majority of the void is disposed in the first region and a majority of the first portion of the weight member is disposed in the second region.

3. The assembly as set forth in claim 2 wherein the majority of the portion of the weight member includes the entire portion of the weight member that is disposed in the second region.

4. The assembly as set forth in claim 1 wherein the void includes a plurality of voids spaced from each other, with each of the plurality of voids opposing the first portion of the weight member.

5. The assembly as set forth in claim 4 wherein the plurality of voids are disposed completely through the drive member of the first shaft.

6. The assembly as set forth in claim 1 wherein the void includes a pair of voids spaced from each other, and the pair of voids are a mirror image of each other, and wherein the pair of voids oppose the first portion of the weight member.

7. The assembly as set forth in claim 6 wherein the pair of voids are disposed completely through the drive member of the first shaft.

8. The assembly as set forth in claim 1 wherein the drive member of the crankshaft and the drive member of the first shaft mesh together such that the rotation of the first shaft is driven by the rotation of the crankshaft.

9. The assembly as set forth in claim 8:
further including a second shaft rotatable about a second pivot axis in response to rotation of the first shaft such that the rotation of the second shaft is driven by the rotation of the first shaft; and
wherein the longitudinal axis, the first pivot axis and the second pivot axis are spaced from each other and substantially parallel to each other.

10. The assembly as set forth in claim 9 wherein:
a weight member that extends from the second shaft and the weight member of the second shaft is positioned along the second shaft to balance the crankshaft during rotation of the crankshaft and the second shaft;
a drive member that surrounds the second shaft and surrounds a portion of the weight member of the second shaft; and
the drive member of the second shaft defines a void that opposes the portion of the weight member of the second shaft.

11. The assembly as set forth in claim 10 wherein:
the first shaft defines a length between the first and second ends of the first shaft;
the first shaft is disposed along a plane and the plane is coincident with the first pivot axis axially relative to the length of the first shaft to split the first shaft and the drive member of the first shaft in half to define a first region and a second region;
a majority of the void of the first shaft is disposed in the first region and a majority of the first portion of the weight member of the first shaft is disposed in the second region;
the second shaft is disposed along the plane and the plane is coincident with the second pivot axis to split the second shaft and the drive member of the second shaft in half to define a first region and a second region; and
a majority of the void of the second shaft is disposed in the first region of the second shaft and a majority of the portion of the weight member of the second shaft is disposed in the second region of the second shaft.

12. The assembly as set forth in claim 9 wherein the first shaft rotates in an opposite direction about the first pivot axis from the rotation of the crankshaft about the longitudinal axis, and the second shaft rotates in a same direction about the second pivot axis as the rotation of the crankshaft about the longitudinal axis.

13. The assembly as set forth in claim 11 wherein:
the drive member of the crankshaft is a gear;
the drive member of the first shaft is a gear; and
the drive member of the second shaft is a gear.

14. The assembly as set forth in claim 1:
further including a second shaft rotatable about a second pivot axis in response to rotation of the crankshaft;
a drive member that surrounds the second shaft; and
wherein the longitudinal axis, the first pivot axis and the second pivot axis are spaced from each other and substantially parallel to each other.

15. The assembly as set forth in claim 14 wherein:
the drive member of the crankshaft and the drive member of the second shaft mesh together such that the rotation of the second shaft is driven by the rotation of the crankshaft; and
the drive member of the first shaft and the drive member of the second shaft mesh together such that the rotation of the first shaft is driven by the rotation of the second shaft.

16. The assembly as set forth in claim 15 wherein the second shaft rotates in an opposite direction about the second pivot axis from the rotation of the crankshaft about the longitudinal axis, and the first shaft rotates in a same direction about the first pivot axis as the rotation of the crankshaft about the longitudinal axis.

17. The assembly as set forth in claim 1 wherein the longitudinal axis and the first pivot axis are spaced from each other and substantially parallel to each other, and further including a secondary drive member that surrounds the first end of the first shaft, and wherein the drive member of the first shaft and the first portion of the weight member are disposed between the secondary drive member and the second portion of the weight member.

18. The assembly as set forth in claim 1 wherein the void is disposed partially through the drive member of the first shaft such that the drive member presents a side wall and a base wall that border the void.

19. The assembly as set forth in claim 1 wherein the void is disposed completely through the drive member of the first shaft.

20. A powertrain comprising:
a housing;
a crankshaft-balancing assembly at least partially disposed inside the housing, and wherein the crankshaft-balancing assembly includes:
a crankshaft rotatable about a longitudinal axis;

a drive member secured to the crankshaft;
a first shaft rotatable about a first pivot axis, wherein the first shaft is rotatable in response to rotation of the crankshaft;
a weight member that extends from the first shaft and the weight member is positioned along the first shaft to balance the crankshaft during rotation of the crankshaft and the first shaft;
a first drive member that surrounds the first shaft and surrounds a first portion of the weight member;
wherein the first drive member of the first shaft defines a void that opposes the first portion of the weight member;
a secondary drive member that surrounds the first shaft and is spaced from the first drive member;
wherein a second portion of the weight member is disposed between the first drive member and the secondary drive member;
wherein the secondary drive member surrounds a third portion of the weight member; and
wherein a fourth portion of the weight member is disposed between a distal end of the first shaft and the secondary drive member.

* * * * *